(No Model.)  
2 Sheets—Sheet 1.

E. H. TURNER.
AUXILIARY SEAT FOR BUGGIES.

No. 393,129.  
Patented Nov. 20, 1888.

WITNESSES:  
F. McArdle.  
C. Sedgwick.

INVENTOR:  
E. H. Turner.  
BY Munn & Co.  
ATTORNEYS.

(No Model.) 2 Sheets—Sheet 2.
E. H. TURNER.
AUXILIARY SEAT FOR BUGGIES.
No. 393,129. Patented Nov. 20, 1888.
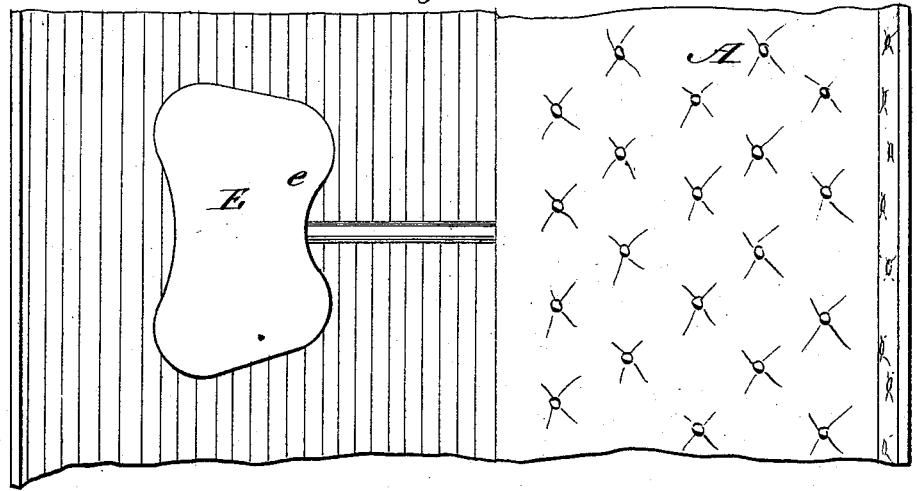
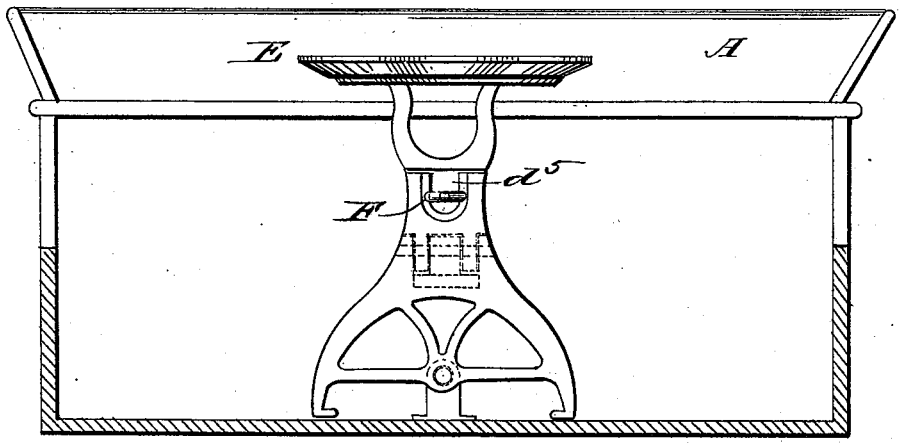
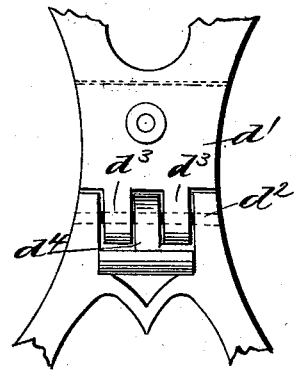
WITNESSES:
INVENTOR:
E. H. Turner
BY Munn & Co.
ATTORNEYS.

UNITED STATES PATENT OFFICE.

EDMUND H. TURNER, OF FERGUS FALLS, MINNESOTA.

AUXILIARY SEAT FOR BUGGIES.

SPECIFICATION forming part of Letters Patent No. 393,129, dated November 20, 1888.

Application filed September 15, 1888. Serial No. 285,518. (No model.)

*To all whom it may concern:*

Be it known that I, EDMUND H. TURNER, of Fergus Falls, in the county of Otter Tail and State of Minnesota, have invented a new and Improved Auxiliary Seat for Buggies, of which the following is a full, clear, and exact description.

The object of the invention is to provide a buggy or like vehicle, in addition to its usual seat, with an auxiliary seat adapted, when not in use, to be readily knocked down and stored beneath the usual seat.

The invention consists in the novel construction and combination of parts, hereinafter described, and defined in the claims.

Reference is to be had to the accompanying drawings, forming a part of this specification, in which similar letters of reference indicate corresponding parts in all the figures.

Figure 1:
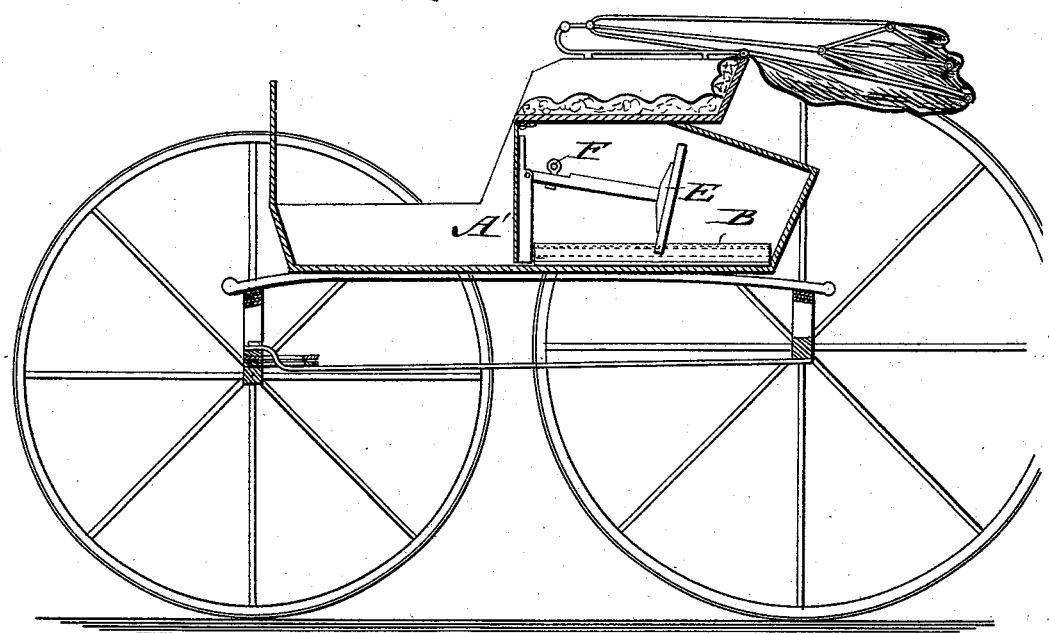
Figure 2:
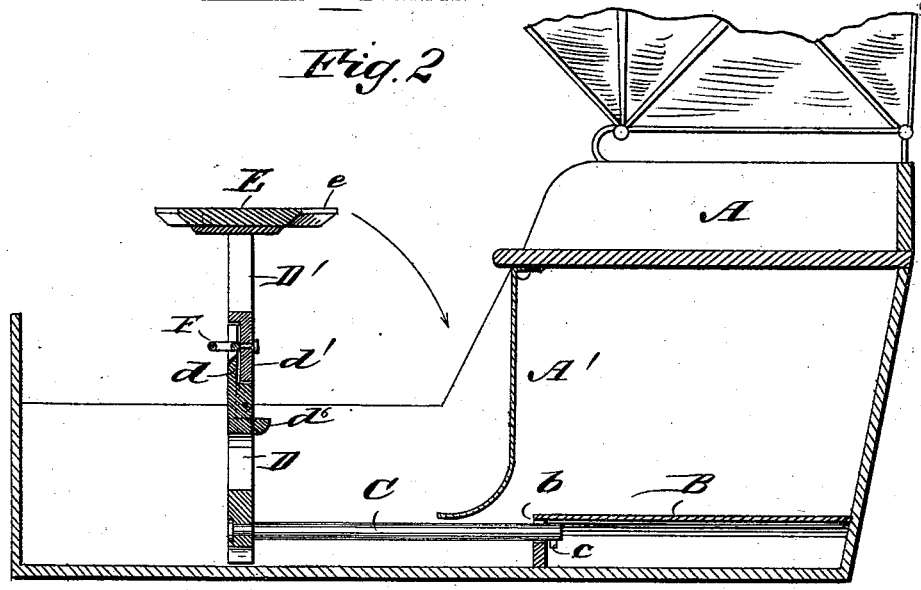

Figure 1 is a central longitudinal sectional elevation of a buggy provided with my improved seat attachment with the latter stored beneath the usual seat. Fig. 2 is a like view of a portion of the buggy, the auxiliary seat being adjusted for use. Fig. 3 is a plan view of a portion of the buggy with the seat adjusted for use. Fig. 4 is a front view thereof, and Fig. 5 is an enlarged back view of a portion of the seat, showing the hinge of the hinged seat-standard.

In providing a buggy with my auxiliary seat a tubular guide-case, B, is fitted beneath the usual seat, A, of the buggy, to lie in a direction from front to rear thereof. In an aperture, $b$, in the front end of the case B, slides the horizontal rod C, provided at its inner end within the said case with a stop, $c$, for limiting its outward movement, and to the outer end of the rod C is rigidly connected the seat-standard consisting of the hinged members D D′, the upper one, D′, being provided with a seat, E. The adjoining hinged ends of the members D and D′ are rabbeted, and the projection $d'$ of the upper member, D′, of the rabbet is hinged to the lower member, D, at the base of the recess $d$ thereof, the hinge-pin $d^2$ passing through ears $d^3$ on the upper member and ears $d^4$ on the lower member. The projection or extension $d'$ of the upper member, D′, is provided with a turn-button, F, whose head is adapted, when turned to the vertical position, to pass through a slot or opening, $d^5$, in the lower member, D, and when the said button is turned to the horizontal position, as in Fig. 4, it will maintain the upper member, D′, in raised position. Upon turning the button F the upper member, D′, and its seat E may be swung down on the hinge-pin $d^2$, when it may be slid in beneath the vehicle-seat and be concealed behind the curtain A′ thereof, as in Fig. 1. The lower member, D, of the seat-standard is provided with a stop or shoulder, $d^6$, which affords a partial support for the upper member, D′, when the latter is in the lowered position. The seat E is formed in its back edge with a concave or recess, $e$, whereby the seat, when lowered, will pass either side of the casing B, and thus not injure the latter.

The adjusting of the seat is so simple that it may be accomplished by any one without trouble.

Having thus fully described my invention, I claim as new and desire to secure by Letters Patent—

1. The combination, with a vehicle, of a horizontally-sliding rod beneath the usual seat thereof, and a standard fixed to said rod hinged at about its center and carrying a seat, substantially as described.

2. The combination, with a vehicle, of a tubular casing located beneath the seat thereof, a rod sliding in said casing, and a standard secured to said sliding rod consisting of hinged members and carrying a seat, substantially as described.

3. The combination, with a vehicle, of the tubular casing B, the horizontally-sliding rod C, and the standard consisting of members D D′, the lower one of which is secured to the rod C and the upper one of which carries a seat, E, substantially as described.

4. The combination, with a vehicle of the character described, of a casing, B, located beneath the seat thereof, the rod C, sliding in said casing, and the standard consisting of hinged members D D′, the one D being secured to the rod C, and the one D′ having a seat, E, formed with a recess, e, in its back edge, substantially as described.

5. The combination, in an auxiliary seat for vehicles, of a horizontal rod, a standard formed of hinged members, the said members being rabbeted at the hinge-joint, a turnbutton carried by one member and acting to lock the same in the vertical position, and a seat on said standard, substantially as described.

EDMUND H. TURNER.

Witnesses:
WILLIAM L. PARSONS,
JAMES A. BROWN.